July 4, 1967

D. PETERSON ET AL 3,328,999

TOOL HANDLE

Filed July 28, 1964

INVENTORS
DANA PETERSON
WILMER W. MORGAN

United States Patent Office 3,328,999
Patented July 4, 1967

3,328,999
TOOL HANDLE
Dana Peterson, San Diego, Calif. (P.O. Box 412, Coronado, Calif. 92118), and Wilmer W. Morgan, P.O. Box 1242, San Diego, Calif. 92112
Filed July 28, 1964, Ser. No. 385,644
2 Claims. (Cl. 72—388)

This invention is in combination a tool handle comprising operatively engaging sections in association with a plurality of work engaging members providing tube and wire bending and torque means.

The primary object of our invention is to provide an inexpensive handle with tool means that is light, compact, strong, and may be used effectively in the refrigeration repair, hobby, and other fields.

Types of tool handles in common use today do not include a tube and wire bending tool or means within a torque type handle. Our tool handle may be positioned for a "T" configuration that may be used as a means of applying torque to the tool. Most tube and wire bending tools are an assembly of numerous parts.

Note the simplicity of our invention comprising three parts: the upper section, a hinge pin, and the lower section.

Together with its objects and advantages our invention will be best understood from a study of the following description taken in connection with the accompanying drawings wherein.

This novel tool handle consists essentially of four elements emanating from three parts:

(a) The upper section having a receiving/bending groove,
(b) A hinging pin,
(c) The lower section having a receiving/bending groove,
(d) The fourth element consisting of two opposite and cooperate, receiving/bending grooves in the tool handle hinging area.

The upper and lower handle sections are of a material such as plastic, wood, metal, or hard rubber and the pin is of metal or plastic.

Figures 1, 2, 3, 4:
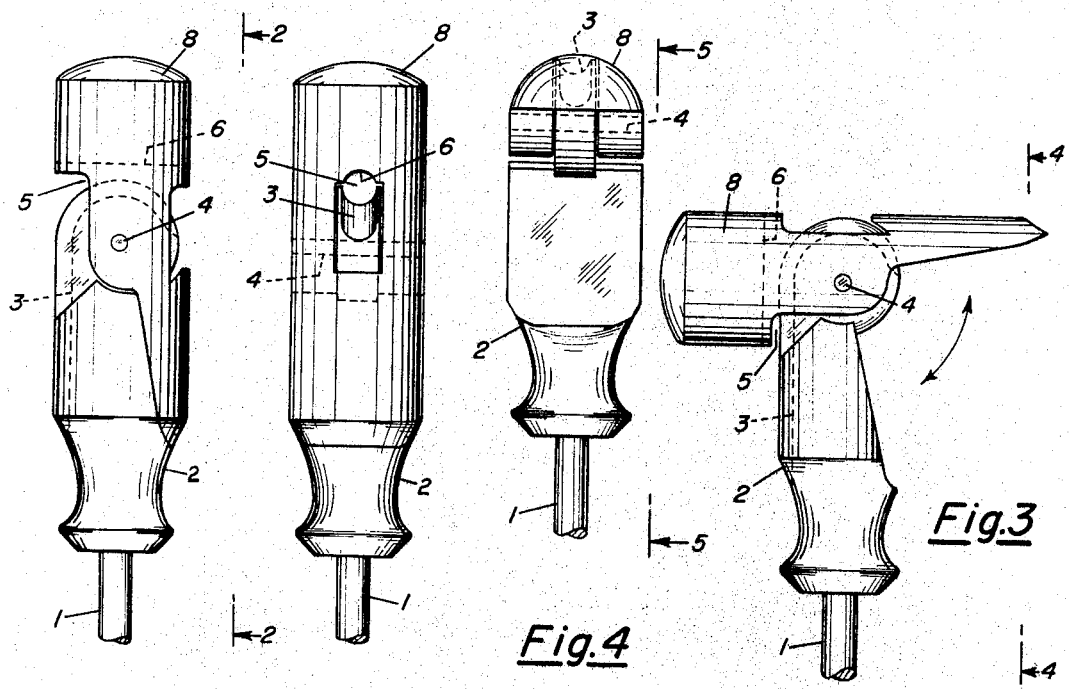
FIG. 1 is a side elevational view of the tool handle in closed position.
FIG. 2 is a rear elevational view of our invention in closed position on the line 2—2, FIG. 1.
FIG. 3 is a side elevational view of the invention in open position on the line 5—5, FIG. 4.
FIG. 4 is a rear elevational view of the tool handle in open position on the line 6—6, FIG. 5.
Figures 5, 6, 7:
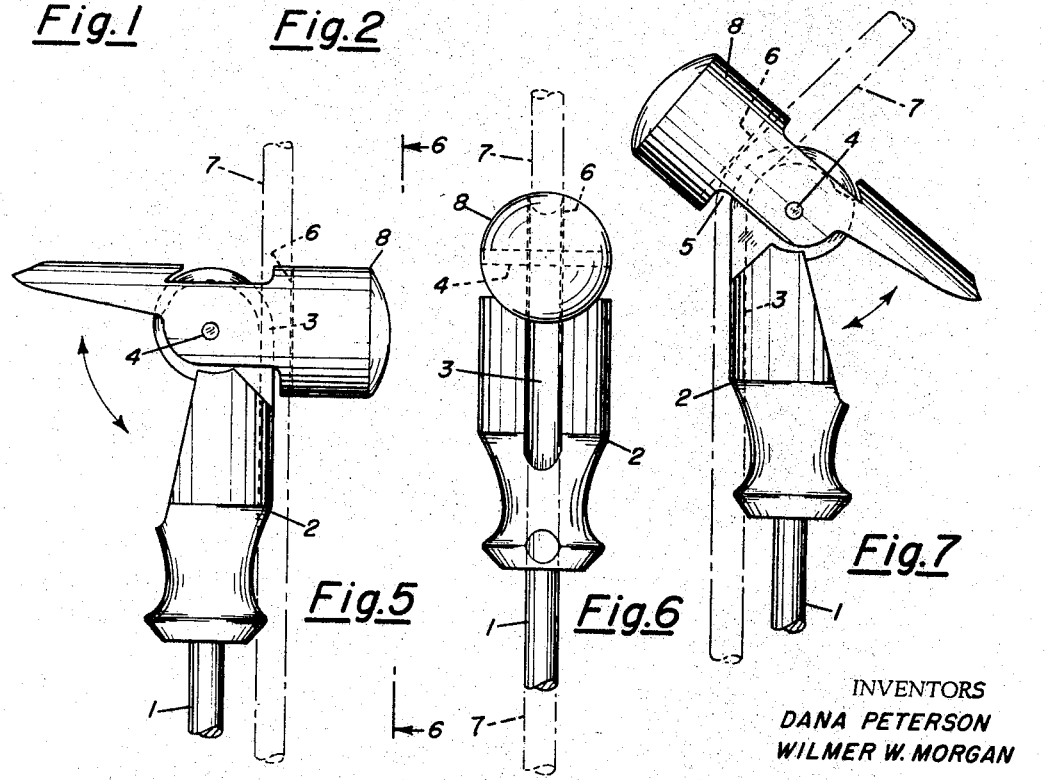
FIG. 5 is a side elevational view of our invention showing a length of tubing positioned in the receiving/bending grooves of the tool handle said tool handle being in open position.
FIG. 6 is a front elevational view of the tool handle showing a length of tubing positioned in the receiving/bending grooves of the tool handle on the line 6—6, FIG. 5.
FIG. 7 is a side elevational view of our invention showing a length of tubing positioned in the receiving/bending grooves said tubing having an obtuse angle bend.

In FIGURES 1 through 7 numeral 1 indicates a shank, 2 the lower handles section, 3 a groove in said lower handle section 2, said groove to accommodate a wire or tube, 6 shows a groove in upper handle section 8 to accommodate a wire or tube, 4 indicates a pin for hinging and pivotal means of both lower and upper handle sections, 5 shows an aperture formed by grooves 3 and 6 in the hinging section of the tool handle. Numeral 7 indicates a length of tubing.

To use our invention for employing torque, the lower handle section 2 is held in one hand and the upper handle section 8 is moved by the other hand until a T-shaped configuration is achieved.

To use our tool handle as a tube or wire bending means, the foregoing T-configuration is utilized and one end of tube 7 is inserted through aperture 5, one hand holds tube 7 firmly in groove 3 and pressure is exerted by the other hand against the upper handle section 8 until the desired bend is achieved in tube 7. The bending pressure is released, the T-configuration made again, and the angle-formed tube is easily withdrawn from the tool handle.

We claim:

1. A tool handle comprising an upper handle section of high impact resistance plastic having a groove disposed transversely in relation to the sides of said upper handle section, a recessed portion extending axially along a side of said upper tool handle section to receive a grooved semi-circular tongue-shaped hinging element of a lower handle section of high impact resistance plastic said lower handle section being formed to be received from said side of the upper handle section, said hinging element employing pin means, two apertures being provided in the upper handle section to accommodate the extremities of a hinging pin and one aperture being provided in the hinging element of the lower handle section to accommodate the center section of said pin.

2. A tool handle adapted for use having an upper and lower handle member joined by hinging means said hinging means including a pin extending through a hinging aperture in each of said upper and lower handle members, a semi-circular tongue-shaped element extending from one of said handle section members to be received by the other of said members said members embodying opposite facing grooves in the hinging section of said members and the lower member groove extending along the length of one straight side and continuing around a semi-circumferal joining section of said tongue-shaped element and the upper handle member having its groove adjacent the hinging aperture with said groove positioned opposite the semi-circumferal groove in the lower handle member.

References Cited
UNITED STATES PATENTS

| | | | |
|---|---|---|---|
| 2,428,237 | 9/1947 | McIntosh | 72—388 |
| 2,464,800 | 3/1949 | Franck | 72—388 |
| 2,654,279 | 10/1953 | Tomarin | 72—388 |
| 2,757,562 | 8/1956 | Zales | 72—388 |
| 3,186,009 | 6/1965 | Simmons | 7—16 |

CHARLES W. LANHAM, Primary Examiner.
RICHARD J. HERBST, Examiner.
G. P. CROSBY, Assistant Examiner.